United States Patent
Nakano et al.

(10) Patent No.: US 7,577,434 B2
(45) Date of Patent: Aug. 18, 2009

(54) HANDOVER METHOD IN WIRELESS LAN BY ASSIGNING AN IDENTIFICATION CODE TO A MOBILE STATION

(75) Inventors: Yoshihisa Nakano, Saitama (JP); Hiroyuki Akiyama, Tokyo (JP); Takashi Namura, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 577 days.

(21) Appl. No.: 11/385,918

(22) Filed: Mar. 22, 2006

(65) Prior Publication Data

US 2006/0251021 A1  Nov. 9, 2006

(30) Foreign Application Priority Data

Mar. 25, 2005  (JP) ............................ 2005-087498

(51) Int. Cl.
*H04W 36/00* (2009.01)
*H04W 4/00* (2009.01)
*H04B 7/00* (2006.01)

(52) U.S. Cl. ................ 455/436; 455/438; 370/332

(58) Field of Classification Search ............ 455/41.2, 455/41.3, 436–438, 440, 442, 443; 370/331–332, 370/338
See application file for complete search history.

(56) References Cited

U.S. PATENT DOCUMENTS 6,889,045 B2 * 5/2005 Pan et al. ............ 455/436
7,236,786 B2 * 6/2007 Shen et al. .......... 455/436

FOREIGN PATENT DOCUMENTS

JP  2003-259417  9/2003

OTHER PUBLICATIONS

ANSI/IEEE Std 802. 11, 1999 Edition, "Wireless LAN Medium Access Control (MAC) and Physical Layer (PHY) Specifications".

* cited by examiner

*Primary Examiner*—Patrick N Edouard
*Assistant Examiner*—Michael T Thier
(74) *Attorney, Agent, or Firm*—Studebaker & Brackett PC; Donald R. Studebaker

(57) ABSTRACT

A handover method is to provided by which a station can move between access points with interruption in communication minimized. An access point assigns mobile stations existing in its own wireless network to identification codes, different from station to station, to thereby carry out association, and thereafter transmits beacon frames each containing a different identification code to the mobile stations. The identification codes are allocated beforehand specifically to each of the access points included in the wireless LAN. When the station is handed over to an adjacent access point, the adjacent access point transmits beacon frames containing the corresponding identification code to that station. Thus, the station is able to continue communication without recognizing the transfer from one wireless network to another.

8 Claims, 12 Drawing Sheets

Fig. 2A
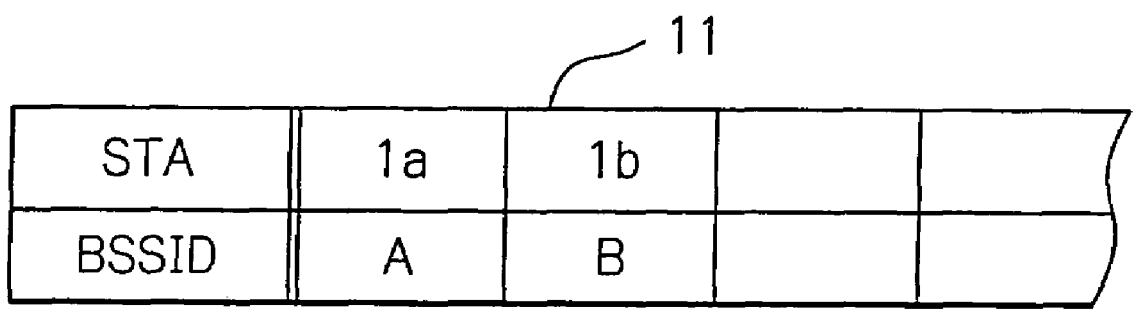
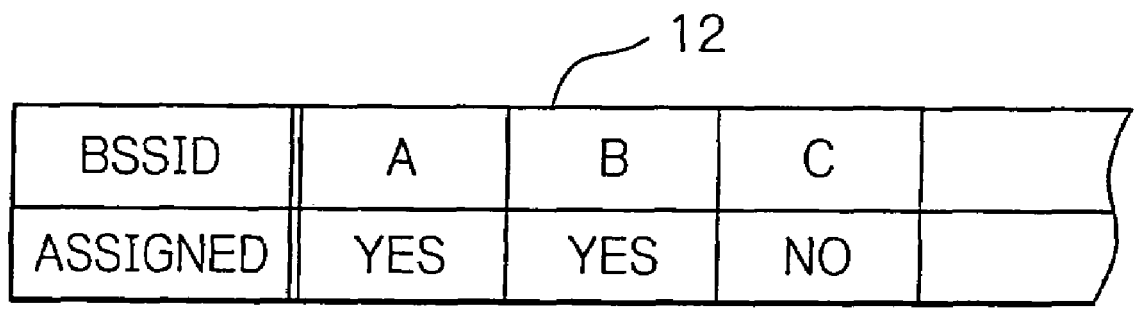

Fig. 3A

| FRAME CONTROL INFORMATION | COMMUNICATION TIME | DESTINATION ADDRESS (DA) | SOURCE ADDRESS (SA) | IDENTIFICATION CODE (BSSID) | SEQUENCE NUMBER | FRAME BODY | ERROR DETECTING CODE |

| FRAME CONTROL INFORMATION | COMMUNICATION TIME | ADDRESS 1 | ADDRESS 2 | ADDRESS 3 | SEQUENCE NUMBER | FRAME BODY | ERROR DETECTING CODE |

16

| DIRECTION \ ADDRESS | ADDRESS 1 | ADDRESS 2 | ADDRESS 3 |
|---|---|---|---|
| ACCESS POINT → STATION | DESTINATION ADDRESS | IDENTIFICATION CODE | SOURCE ADDRESS |
| STATION → ACCESS POINT | IDENTIFICATION CODE | SOURCE ADDRESS | DESTINATION ADDRESS |

HANDOVER METHOD IN WIRELESS LAN BY ASSIGNING AN IDENTIFICATION CODE TO A MOBILE STATION

BACKGROUND OF THE INVENTION

1. Field of the Invention

The present invention relates to a wireless local area network (LAN) composed of plural access points, and more particularly to a handover processing required when a mobile station connected to the network moves between access points.

2. Description of the Background Art

Generally, a wireless LAN is composed of a plurality of basic service sets (BSS), a kind of wireless network, in each of which a base station, or access point (AP) works as a central coordinator adapted to communicate with a mobile terminal device, or station (STA), staying in the wireless network BSS. The access points are able to transfer communication frames to another station existing in the same wireless network BSS, or to transfer communication frames to another station existing in another wireless network BSS. In the latter case, transferring to a destination station existing in the other wireless network BSS, the communication frames sent from the originating station to the access point are further transferred to the other access point over a fixed communication channel interconnecting both of the access points, and then arrive at a destination station existing in the other wireless network BSS. In wireless LAN systems, an extended wireless network interconnecting the wireless networks or BSSs is called as an extended service set (ESS).

An extended wireless network ESS implements a service to interconnect wireless networks by connecting an access point to another access point, and also to connect a kind of network other than a wireless LAN. For example, an extended wireless network is connected to a wired LAN via a router or a switching device and further to the Internet over there. Thus, in the wireless LAN there are two kinds of service sets, the wireless network BSS which includes a central access point and plural stations, and the extended wireless network ESS which interconnects access points or are connected to a wired network other than a wireless LAN.

Communication frame formats transmitted over a wireless LAN include two types of frames such as a management and a data frame, for example. The management frame is used in transmitting a beacon signal periodically from an access point, and in transmitting various management information such as probe request, probe response, authentication, association and disassociation etc., between an access point and stations. The data frame is used in conveying data between a station accepted in joining a wireless network and an access point.

Each wireless network has its unique identification code BSSID to distinguish itself from other wireless networks in the wireless LAN, and sets the BSSID in the header of communication frames. A beacon frame and a data frame are transmitted at a common frequency under the CSMA/CA (Carrier Sense Multiple Access/Collision Avoidance) system, and can be received by any stations in the wireless LAN.

When a moving station intends to communicate with a destination station over a wireless LAN, a procedure for joining and associating the wireless network will proceed. An access point, or base station, included in a wireless network transmits beacon frames indicating network information at constant time intervals in order to broadcast unified time information in its wireless service area and capability information required for mobile stations, or terminals, to join the wireless network. The beacon frame has a role to notify the entity of the wireless network to a mobile station approaching the wireless network. The station can select either to wait for a beacon frame reception or to send out a probe request frame to positively obtain network information from the access point. In the latter case, upon receipt of a probe request frame sent from the station, the access point shall send back a probe response frame. The probe response frame contains the same network information as the beacon frame does, so that the station can obtain the network information without waiting for a beacon frame.

When the station receives the beacon or probe response frame has been received, the station references information contained in the frame to determine whether or not the wireless network complies with its own de-sired condition, i.e. the station conforms to the wireless network to thereby decide to join the network. If the station intends to join, then it has to synchronize its own timer with the time information contained in the beacon or probe response frame of that intended wireless network.

The station thus joined next sends out an authentication request frame to the access point. When the access point receives the authentication request frame sent from the station, the access point determines whether or not to authenticate the station, and then sends out an authentication response frame containing a result from the authentication. If it is authenticated, the station proceeds to a next step to join. If not, however, the station has to give up to join the wireless network and withdraw from the network.

The station thus authenticated next sends out an association request frame to the access point. An association request frame contains information on the capability of the station. The access point, based on this information, determines whether or not the capability of the station is necessary and sufficient for the wireless network. When joining the network, the station determines whether or not its own condition complies with the condition of the wireless network to decide to join, as stated above. When associating the network, the access point evaluates the capability of the station. The result from the evaluation is contained in an association response frame, which will be sent out. If the station is to be associated, then it finishes the procedure. If not, however, the station has to give up to join the wireless network and withdraw from the network. The station that has completed the required joining and association procedures is now able to transmit and receive data frames.

The station thus approved for its association with the wireless network is now able to transmit and receive data frames. It also can receive beacon frames periodically transmitted from the access point. A beacon frame contains in its source address field SA the address of the access point and in its identification code field BSSID the identification code of wireless network, which is usually of the same level as the address of the access point. In addition, a beacon frame also contains time information and operation/management information required for the wireless network. The station receives beacon frames periodically to obtain and use the information to know the entity of the access point and the traffic conditions.

After a series of communication is finished, if the station associated with the wireless network now intends to withdraw from the wireless network, the station may send out a disassociation and a deauthentication frame to the access point to notify the latter of its withdrawal. From the access point, the associated station may receive a disassociation and a deauthentication frame to thereby be ordered to withdraw from the wireless network.

A mobile station, once associated with a wireless network and afterwards withdrew from the network, may rejoin the same or another wireless network within the same extended wireless network including the former wireless network by using a reassociation request frame. The reassociation procedure is to notify the address of the access point of the wireless network once associated to thereby simplify the procedure otherwise required for rejoining the same extended wireless network.

A handover function refers to the transfer of management of a mobile station, while moving, under the management of an access point to another access point. When a station already associated with a wireless network is going to make handover to a different wireless network, it will first withdraw from the wireless network including the access point currently associated, and next send a probe request frame to find out a new access point to which it approaches. The station receives a probe response frame sent from the new access point, and thereafter it carries out successive procedures, joining, authentication and reassociation with the new access point, thus completing its handover.

In recent years, the needs are increasing not only for the data communications but also for the voice communications using VoIP (Voice over Internet Protocol) technology, and a lot of terminal devices functioning as cellular phones are being marketed. Such terminal devices functioning as cellular phone are movable while included in communication with an access point, and therefore required to appropriately maintain continuous communication while moving from one access point to another to be connected.

However, a handover function implemented on such terminal devices serving as cellular phone associated with a wireless network would require a series of protocol processing, such as disassociation, joining, authentication and reassociation as described above, thus causing an interruption on communication over several hundred milliseconds. To data communications, not requiring a strict real-time transmission, the above mentioned procedures may be directly applied without difficulty. In applications such as VoIP or moving picture transmission, however, the interruption of transmission would cause a very serious problem. For example, in VoIP communications, voice frames have to be transmitted periodically every 50 millisecond, and therefore an interruption of communication over several hundred milliseconds seriously affects its communication quality.

SUMMARY OF THE INVENTION

It is an object of the present invention to provide a handover method of allowing a mobile station to move between access points with interruption in communication minimized.

In accordance with the present invention, a handover method as described below is carried out in a wireless local area network (LAN) including a first access point that controls wireless communications with mobile stations existing in a first wireless area and a second access point that controls wireless communications with mobile stations existing in a second wireless area, the first and second wireless area partially overlapping each other.

In accordance with the invention, the handover method comprises the steps of: assigning, when the first access point is requested by first one of the stations existing in the first wireless area for an association with the wireless LAN, a first identification code different from an identification code assigned to another of the stations which is already associated with the wireless LAN to approve the association; assigning, when the second access point is requested by second one of the stations existing in the second wireless area for an association with the wireless LAN, a second identification code different from an identification code assigned to another of the stations which is already associated with the wireless LAN to approve the association; periodically transmitting from the first or second access point a beacon frame to the first or second station existing and associated in the first or second wireless areas, respectively, the beacon frame containing an identification code corresponding to the first or second station; monitoring by the first access point a signal received from the first station existing in the first wireless area; requesting, when the first access point detects the received signal being lower than a predetermined level, the second access point for a handover of the first station; determining, when the second access point is requested for the handover from the first access point, whether to accept the handover based on a signal received from the first station; accepting the handover of the first station by the second access point; and periodically transmitting from the second access point, in place of the first access point, a beacon frame containing the first identification code assigned to the first station.

In accordance with the invention, an identification code not duplicating in a wireless LAN is assigned to a mobile station that intends to be associated with the wireless LAN. Then, the access point of a wireless area in which the station thus associated exists transmits beacon frames having the identification code thereof assigned to the station. When the station moves into another wireless area, the access point of the other wireless area transmits beacon frames having the identification code thereof assigned to the station. That allows the station to use the identification code initially assigned at the time of the association to continue communication when moving anywhere within the area of the wireless LAN, thus achieving a favorable mobility of the station between access points without interrupting communication.

A handover method as described below is carried out in a wireless LAN including a first access point that uses a first identification code and controls wireless communications with mobile stations existing in a first wireless area and a second access point that uses a second identification code and controls wireless communications with mobile stations existing in a second wireless area, the first and second wireless area partially overlapping each other.

Each of the first and second access points transmits periodically beacon frames containing the identification codes used by the appropriate access point to mobile stations existing in its own wireless area. While the first access point monitors a received signal from a station existing in its own wireless area, the first access point requests, if the received signal has become lower than a predetermined level, the second access point for a handover of the station. When the second access point receives the handover request sent from the first access point, the second access point determines whether to accept the handover based on the received signal from the station. The second access point accepts the handover of the station, and thereafter the second access point periodically transmits beacon frames containing the first identification code to the station.

BRIEF DESCRIPTION OF THE DRAWINGS

The objects and features of the present invention will become more apparent from consideration of the following detailed description taken in conjunction with the accompanying drawings in which:

FIG. 2A schematically shows data of tables stored in an access point included in the wireless LAN system shown in FIG. 2;

FIGS. 3A and 3B show an example of communication frame formats transmitted over a wireless LAN;

DESCRIPTION OF THE PREFERRED EMBODIMENTS

Figure 1:
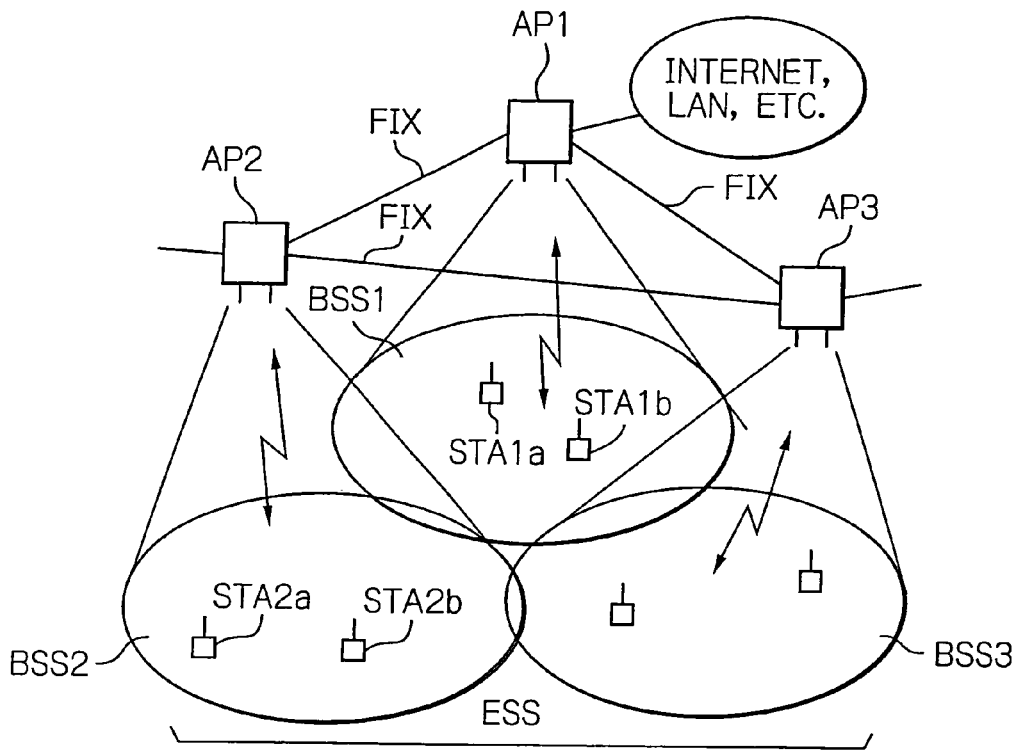
FIG. 1 conceptually shows a wireless LAN system to which the present invention is applicable.

With reference to FIG. 1, first, which conceptually shows a wireless local area network (LAN) system 10, to which the present invention is applicable. The wireless LAN system 10 illustrated is composed of a plurality of wireless networks BSS1, BSS2 and BSS3, which include base stations, or access points, AP1, AP2 and AP3, respectively, working as respective central coordinators.

Specifically, one of the access points AP1, for example, communicates with a mobile terminal device, or station, STA1a existing in the wireless network BSS1, and is able to transfer its communication frames to another mobile station STA1b existing in the same wireless network BSS1, or to transfer its communication frames to another mobile station STA2a existing in another wireless network BSS2, for example. In the latter case, communication frames sent from the station STA1a and directed to the other access point STA2a is transferred to the other access point AP2 over a fixed communication channel FIX, and so on which interconnects the access points AP1 and AP2, and then arrives at the destination station STA2a staying in the other wireless network BSS2. The wireless network interconnecting the wireless networks BSS1, BSS2 and BSS3 forms an extended service set (ESS) as described before.

The extended wireless network ESS, which connects the access point AP1 to the other access point AP2 and so on, may also connect a different sort of network 12 other than the wireless LAN 10, such as a wired LAN via a router or a switching device, and further to the Internet over there to thereby provide a service to interconnect wireless networks. As described, in the wireless LAN system 10, there are two kinds of service sets. One is the wireless networks BSS1, BSS2 and BSS3, which include the respective central access points AP1, AP2 and AP3, and plural mobile stations STA1a, STA1b, STA2a, STA2b and so on. The other is the extended wireless network ESS which interconnects those access points or connects a different type of network other than the wireless LAN 10.

FIGS. 3A and 3B show an example of communication frame formats transmitted over the wireless LAN 12. The communication frames include two types of frames such as a management frame 14 shown in FIG. 3A and a data frame 16 shown in FIG. 3B. The management frame 14 is used to transmit a beacon signal periodically from an access point and to transmit and receive various management information such as probe request, prove response, authentication, association and disassociation etc., between an access point and mobile stations. The data frame 16 is used to convey data between an associated station of the wireless network and an access point.

Each wireless network has its unique, or not duplicating, identification code BSSID to be distinguishable from other wireless networks in the wireless LAN 10, and sets a BSSID in the header of the communication frame. A beacon frame and a data frame 16 are transmitted at the same frequency by the CSMA/CA (Carrier Sense Multiple Access/Collision Avoidance) technology, and can be received by any stations in the wireless LAN 10.

Figure 4:
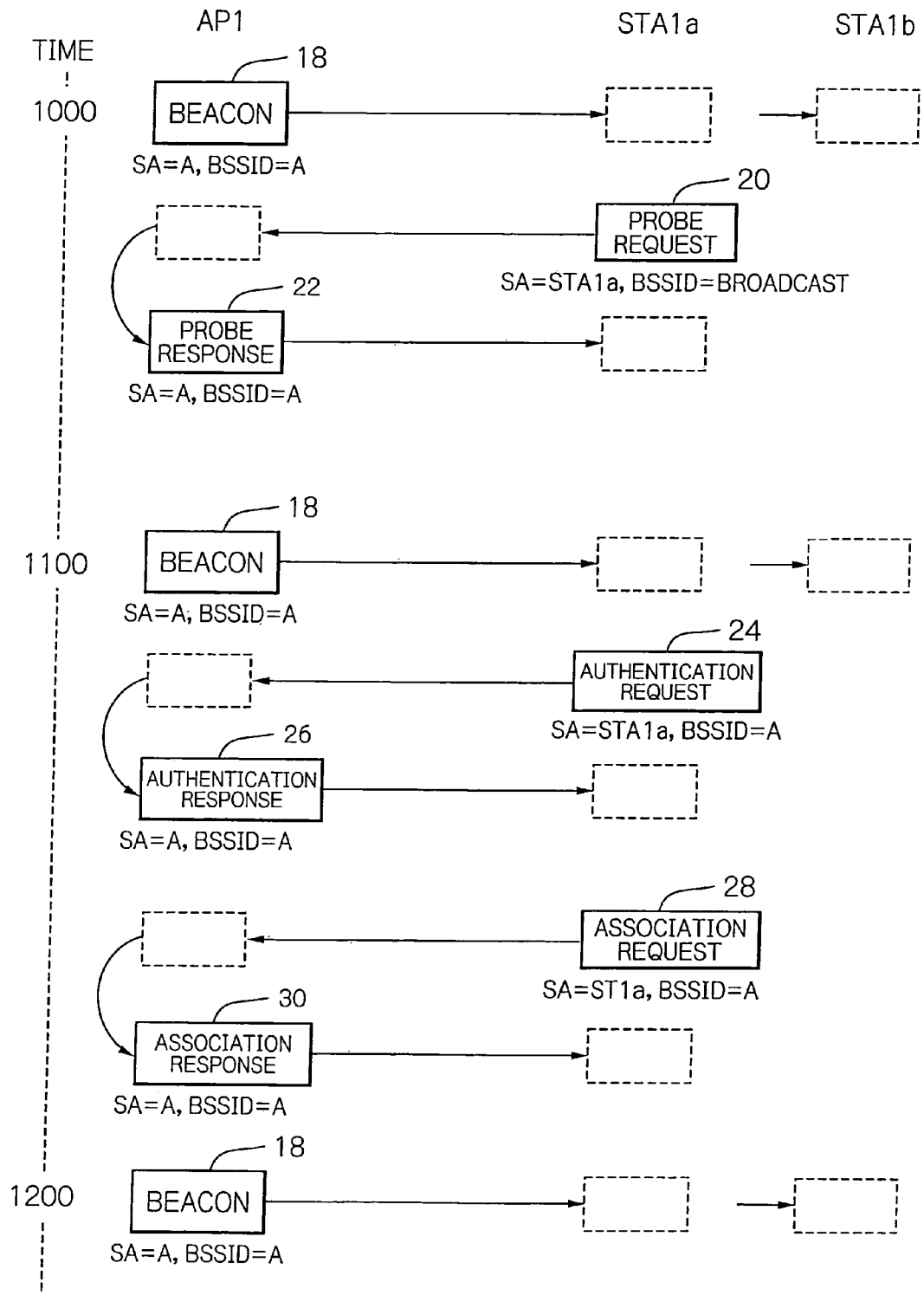
FIG. 4 schematically shows a procedure for joining and associating a wireless network.

Next, the communication procedure will be described when one of the mobile stations, e.g. STA1a, while moving, intends to communicate with its destination station over the wireless LAN 10. FIG. 4 exemplarily shows the procedure of the STA1a joining and associating the wireless network 10. The access point AP1 servicing the wireless network BSS1 transmits beacon frames 18 carrying network information at constant time intervals, at the times 1000, 1100, 1200, . . . in order to broadcast unified time information throughout the wireless service area and capability information required for mobile stations to join the wireless network BSS1. In FIG. 4, the time indication is merely relative and contains no specific meaning in the figures per se.

The beacon frame 18 serves as notifying the station STA1a approaching the wireless network BSS1 of the entity of the wireless network BSS1. The station STA1a can select either to await a reception of the beacon frame 18 or to positively send out a probe request frame 20 to obtain network information from the access point AP1. In the latter case, when a probe request frame 20 has been sent from the station STA1a, the access point AP1 shall send back a probe response frame 22. The probe response frame 22 contains the same network information as the beacon frame 18 does to thereby cause the station STA1a to obtain the network information without waiting for a beacon frame 18.

When the beacon frame 18 or the probe response frame 20 has been received, the station STA1a references the information contained in the frame, and determines whether or not the wireless network BSS1 complies with its own desired condition, i.e. the station STA1a conforms to the wireless network BSS1 to decide to join the network BSS1. If the station STA1a intends to join the network BSS1, then its own timer, not specifically shown, has to be synchronized with the time information contained in the beacon frame 18 or the probe response frame 20 of the intended wireless network BSS1.

The station STA1a thus joined will next send out an authentication request frame 24 to the access point AP1. When the authentication request frame 24 sent from the station STA1a has been received, the access point AP1 determines whether or not to authenticate the station STA1a, and then sends an authentication response frame 26 carrying the result from the authentication. If the station STA1a is authenticated, it proceeds to the next step to join. If the station STA1 is unauthenticated, then it has to give up to join the wireless network BSS1 and withdraw.

The station STA1a, when thus authenticated, will next send out an association request frame 28 to the access point AP1. In the association request frame 28, information on the capability of the station STA1a is contained. Based upon this information, the access point AP1 determines whether or not the capability of the station STA1a is necessary and sufficient for the wireless network BSS1. When joining, the station STA1a determines whether or not its own condition complies with the condition of the wireless network BSS1 to decide to join. While associating, however, the access point AP1 evaluates the capability of the station STA1a. The result from the evaluation is stored in the association response frame 30 to be sent out. If it is associated, the station STA1a finishes the procedure, however, if the station STA1a is unassociated, it has to give up to join the wireless network BSS1 and withdraw. The station STA1a, when completed required joining and association procedures, is now able to transmit and receive data frames 16, FIG. 3B.

In operation, the station STA1a, when having been approved for its association with the wireless network BSS1, is now able to transmit and receive data frames 16. In addition, the station STA1a receives beacon frames 18 periodically transmitted from the access point AP1. In the beacon frame 18, the source address field SA, FIG. 3A, contains the address of the access point AP1 and the identification code field BSSID contains the identification code of the wireless network BSS1, which is usually of the same value as the address of the access point AP1. The beacon frame 18 further contains time information 32 and operation/management information required in the wireless network BSS1. By receiving the beacon frames 18 periodically, the station STA1a can obtain and use the information stated above to be notified of the entity of the access point AP1 and the traffic conditions.

Figure 5:
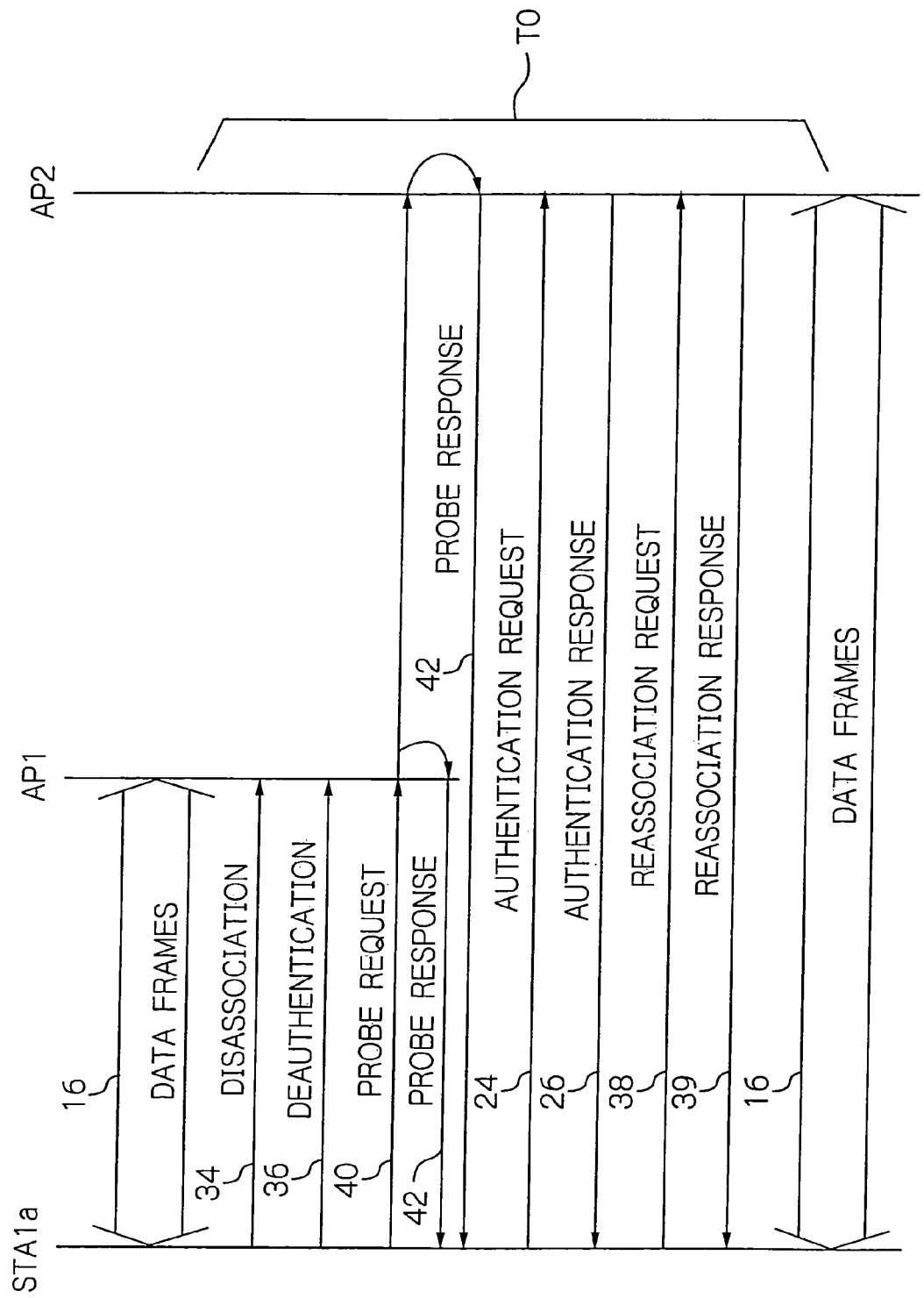
FIG. 5 schematically shows a conventional handover procedure.

After a series of communication continues in the form of data frames 16, if the station STA1a associated with the wireless network BSS1 now intends to withdraw from the wireless network BSS1, the station STA1a can send a disassociation frame 34 and a deauthentication frame 36, FIG. 5, to the access point AP1 notify the latter of its withdrawal. Conversely, the access point AP1 can send a disassociation frame and a deauthentication frame to order the associated station STA1a to withdraw from the wireless network BSS1.

The station STA1a, once associated with a wireless network BSS1 and afterwards withdrew from the network, is able to use a reassociation request frame 38, FIG. 5, to rejoin the same wireless network BSS1 or another wireless network, e.g. BSS2, within the same extended wireless network ESS servicing the former wireless network BSS1. The access point AP2 may in turn transmit a reassociation response frame 39 to the station STA1a. The reassociation service simplifies the procedure which would otherwise be required for rejoining the same extended wireless network ESS by notifying the address of the access point AP1 of the wireless network BSS1 once associated.

FIG. 5 schematically shows a conventional handover procedure. When the station STA1a already associated with the wireless network BSS1 and transmitting data frames 16 to and from the access point AP1 is going to make handover to a different wireless network BSS2, for example, the station STA1a will withdraw from the wireless network BSS1 serviced by the access point AP1 currently associated. The station STA1a therefore sends a probe request frame 40 to locate another access point, e.g. AP2, to which it approaches. The new access point AP2 in turn transmits a probe response frame 42. The station STA1a, when received the response frame 42, carries out successive procedures, i.e. joining, authentication and reassociation with the new access point AP2, thus completing its handover. During the period of time T0, data transmission is interrupted, i.e. from the last data frames to the first data frames following the completion of the handover.

Figure 2:
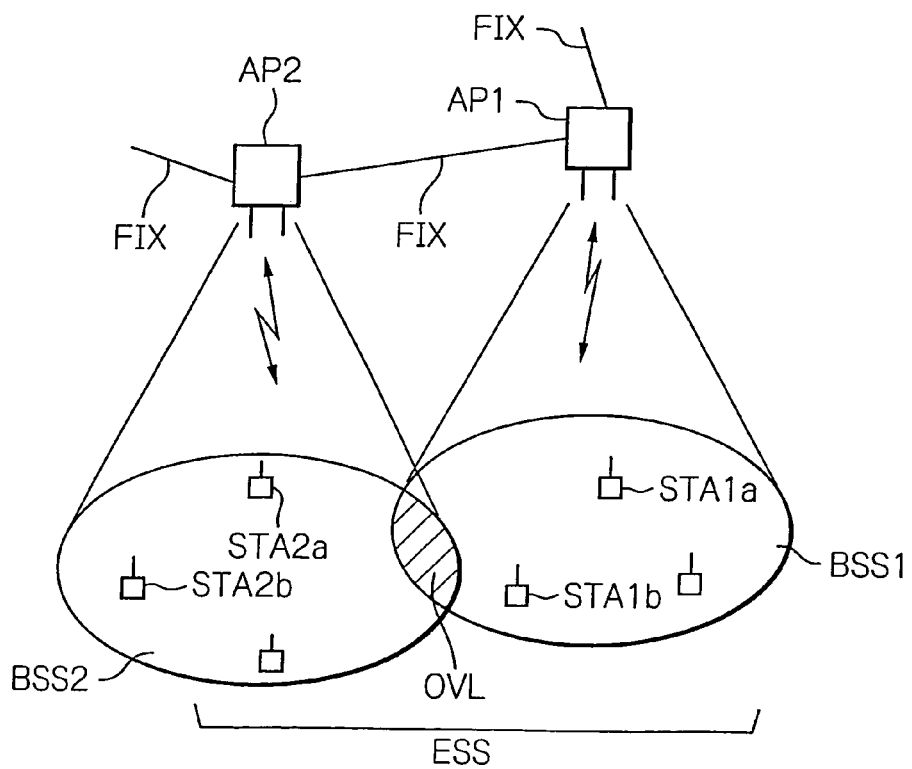
FIG. 2 schematically shows part of the wireless LAN system shown in FIG. 1 and according to a preferred embodiment of the invention.

Well, reference will be made to FIG. 2, schematically showing part of the wireless LAN system 10 according to a preferred embodiment of the invention. Specifically, the wireless LAN system 10 is composed of the base stations, or access points, AP1 and AP2 covering wireless networks BSS1 and BSS 2 respectively, as well as the mobile terminal devices, or stations, STA1a, STA1b, . . . included in the wireless network BSS1, and the mobile stations STA2a, STA2b, . . . included in the wireless network BSS2. There is an overlapping area OVL serviced by both of the wireless networks BSS1 and BSS2. Further, the fixed communication channel FIX is provided between, and interconnects, the access points AP1 and AP2, thus the extended wireless networks ESS being set up.

Each of the access points AP1 and AP2 is provided with an identification code management table 11 and an identification code assignment table 12, FIG. 2A, in order to manage mobile stations staying in the respective networks BSS1 and BSS2. As for the access point AP1, for example, the identification code management table 11 is used to notify the stations STA1a, STA1b, . . . controlled by the access point AP1 of identification codes BSSIDs in the wireless network BSS1, which are different from each other. As shown in FIG. 2A, the stations STA1a and STA1b are assigned to the identification codes "A" and "B", respectively. The table 11 in the access point AP2 contains identification codes BSSIDs different from those of the access point AP1.

The identification code assignment table 12 is provided for the purpose of preventing the different stations STA1a, STA1b, . . . from being notified of the same identification code BSSID, and therefore adapted to manage whether or not the identification codes BSSIDs provided in advance are assigned. In FIG. 2A, identification codes "A", "B" and "C" are "assigned", "assigned" and "unassigned", respectively, for the access point AP1. That is also the case with the access point AP2. In the figure, "assigned" and "unassigned" are respectively depicted with "YES" and "NO".

Figure 6:
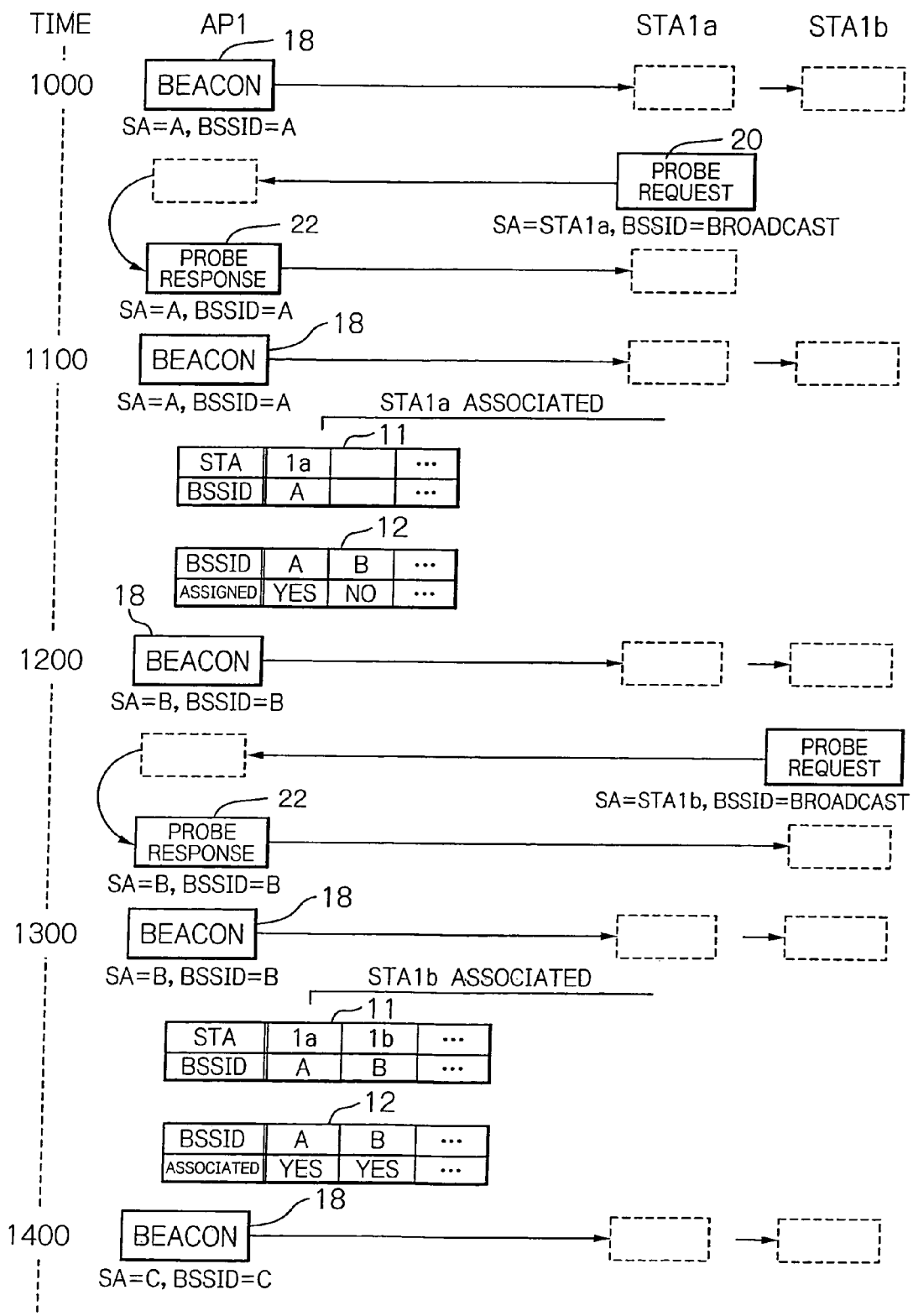
FIG. 6 schematically shows a management procedure for assigning an identification code in the wireless LAN system shown in FIG. 2.

Now, FIG. 6 shows a management procedure for assigning an identification code in the wireless LAN system 10 shown in FIG. 2. The access point AP1, for example, transmits beacon frames 18 periodically with constant time intervals, at the times 1000, 1100, 1200, 1300, . . . In FIG. 6 also, the time indication is merely relative and contains no specific meaning in the figures per se.

Supposing that at the time 1000 there is no station associated with the access point AP1 in the wireless network BSS1. In this case, all of the assignment states of the identification codes BSSIDs having values "A", "B", etc., are set to "unassigned" in the identification code assignment table 12. Both of the source address SA and identification code BSSID contained in the beacon frame 18 to be transmitted from the access point AP1 are set to "A". During this period one of the mobile stations, e.g. STA1a, sends out a probe request frame 20 which has its source address SA set to "STA1a" and its identification code set to "broadcast", or multicast. The access point AP1 sends back a probe response frame 22 which has its source address SA and identification code BSSID both set to "A".

At the time 1100 also, there is no station approved to be associated with the wireless network BSS1 yet. Therefore, both of the source address SA and identification code BSSID contained in the beacon frame 18 to be transmitted from the access point AP1 are set to "A". During this period, if the association of the station STA1*a* is approved, then the station STA1*a* is registered in the identification code management table 11 of the access point AP1 in connection with the identification code BSSID "A", and the assignment state of the identification code BSSID "A" in the identification code assignment table 12 is updated to "assigned".

At the time 1200, since the assignment state of the identification code BSSID "A" is "assigned", the source address SA and identification code BSSID of the beacon frame 18 to be transmitted from the access point AP1 are both set to "B" which is unassigned. During this period, the other station STA1*b* sends a probe request frame 20 which has its source address SA set to "STA1*b*" and its identification code BSSID set to "broadcast", and the access point AP1 sends back the probe response frame 22 which has its source address SA and identification code BSSID both set to "B".

At the time 1300, since the assignment state of identification code BSSID "A" is "assigned" and that of "B" is "unassigned", both of source address SA and identification code BSSID contained in the beacon frame 18 to be transmitted from the access point AP1 are set to "B", which is unassigned. During this period, if the association of the station STA1*b* is approved, then the station STA1*b* is registered in the identification code management table 11 of the access point AP1 in connection with the identification code BSSID "B", and the assignment state of identification code BSSID "B" in the identification code assignment table 12 is changed to "assigned".

Further, after the station STA1*b* is assigned to "B", another station STA1*c*, not shown, sends a probe request frame, and the access point AP1 in turn sends back a probe response frame having its source address SA and identification code BSSID set to "C".

At the time 1400, since the assignment states of identification codes BSSIDs "A" and "B" are "assigned", both of the source address SA and identification code BSSID contained in the beacon frame to be transmitted from the access point AP1 are set to unassigned "C". Thus, the access point AP1 in which the stations STA1*a*, STA1*b*, ... are registered assigns them to the individual identification codes BSSIDs "A", "B", ... ,"respectively, which are different from each other.

Figure 7:
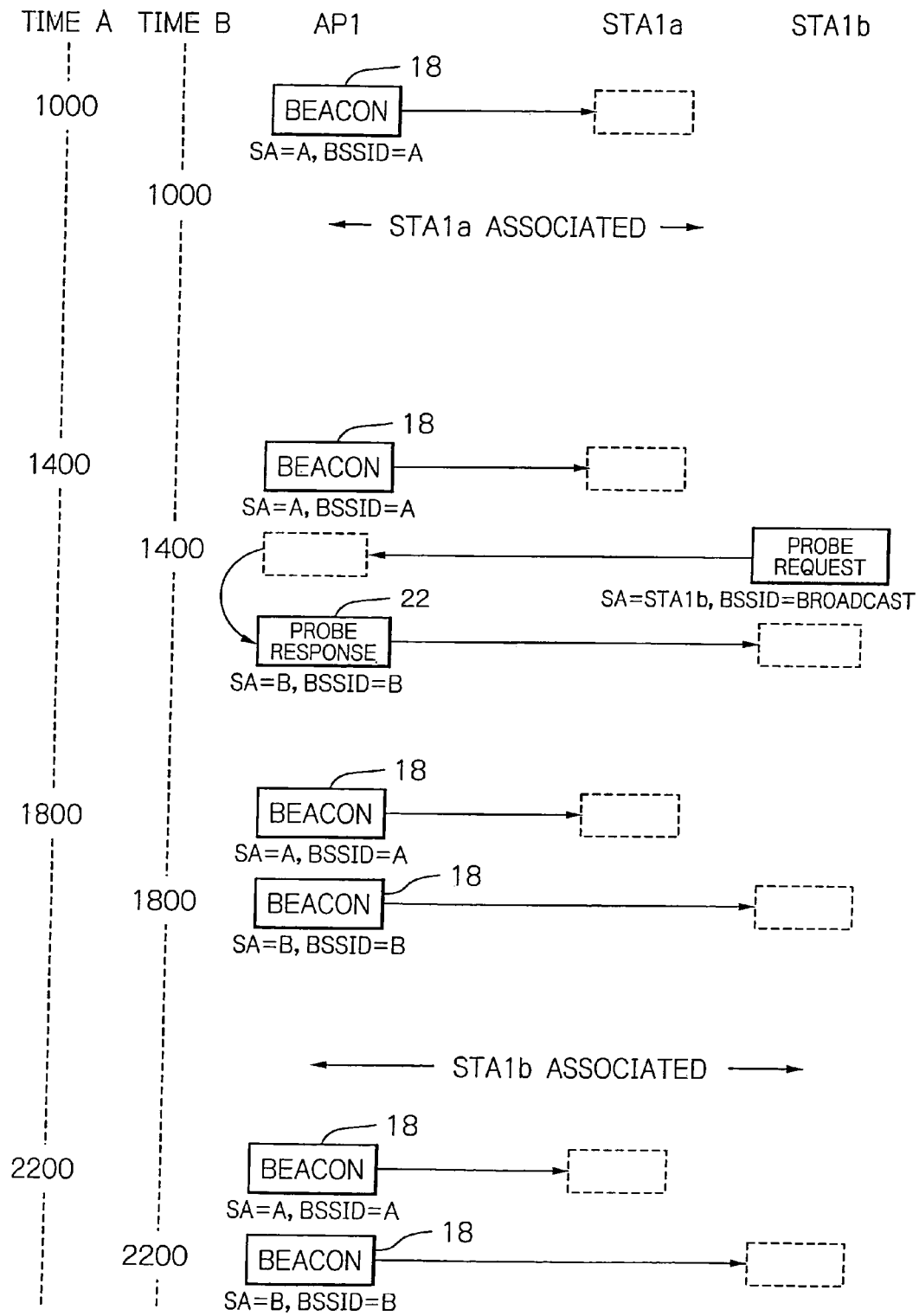
FIG. 7 schematically shows how beacon frames are transmitted by the access point shown in FIG. 2.

FIG. 7 shows how beacon frames 18 are transmitted by the access point AP1 shown in FIG. 2. To unassociated stations, the access point AP1 sends out a beacon frame 18 and a probe response frame 22, both of which have the source address SA and identification code BSSID thereof unassigned. To stations already associated, however, it is required to send beacon frames 18 and probe response frames 22, both of which have the source address SA and identification code BSSID thereof assigned. In other words, as seen from FIG. 7, to mobile stations already associated a beacon frame 18 containing its identification code BSSID assigned is transmitted, whereas to unassociated stations a beacon frame having its identification code BSSID unassigned is transmitted.

FIG. 7 shows the transmission procedure starting, at the time when the probe response frame 22 is transmitted to a mobile station newly joining, to periodically transmit the beacon frames 18 containing a new identification code. FIG. 6 shows the transmission procedure starting, at the time when the new association is approved, to periodically transmit beacon frames containing a new identification code. That is to say, the transmission of a beacon frame containing a new identification code BSSID may be started when the association procedure is finished and/or a probe response frame 22 is transmitted.

Figure 8:
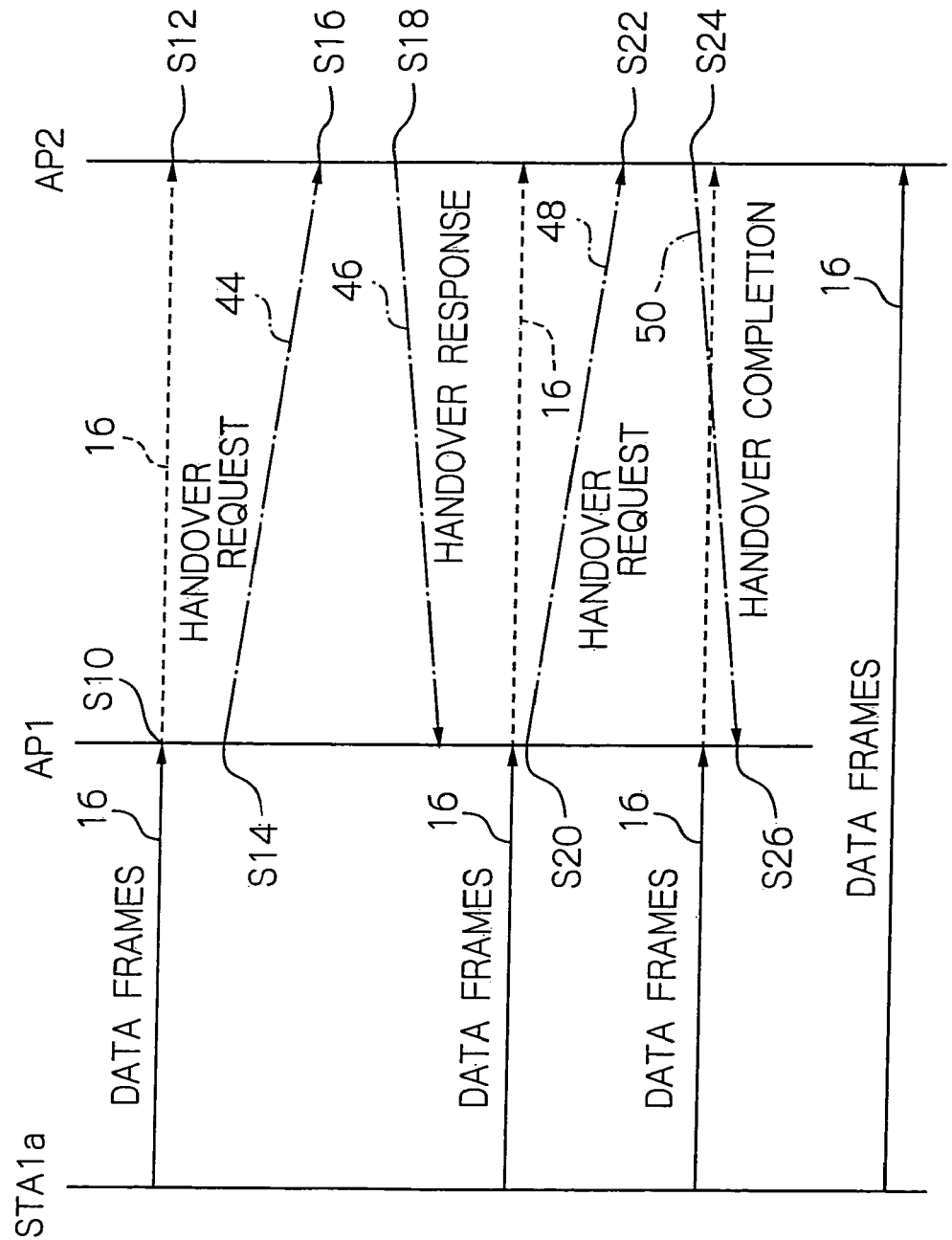
FIG. 8 schematically shows a handover procedure carried out in the wireless LAN system shown in FIG. 2.

FIG. 8 shows the handover procedure carried out in the wireless LAN 10 shown in FIG. 2. While the access point AP1 receives data frames 16 sent from the station STA1*a* having the identification code BSSID thereof allotted to "A", it may detect deterioration in strength of the received signal to determine that the station STA1*a* stays too far from it, step S10. The other access point AP2 also receives data frames 16 sent by the station STA1*a* meant for the access point AP1 and measures the receiving signal strength or the like, step S12. The reception of the data frames 16 addressed to the access point AP1 by the other access point AP2 may be possible in a situation where the station STA1*a* stays in the overlapping area. OVL of the wireless networks BSS1 and BSS2 served by the access points AP1 and AP2, respectively.

The access point AP1, when detected the deterioration in the receiving signal strength, sends out a request for handover 44 for the station STA1*a* to the access point AP2 over fixed communication channel FIX, step S14. Alternatively to sending a request for handover 44 only to the adjacent access point AP2 over fixed communication channel FIX, a handover request 44 may be broadcast to all the access points covered by the same extended wireless network ESS for thereby searching for an access point which can accept the handover.

The access point AP2, when received the handover request 44 for the station STA1*a* from the access point AP1, recognizes that the access point AP1 is willing to hand over the station STA1*a*, and determine whether or not it is possible to accept the handover by itself, step S16. The determination can be made by referencing the communication quality such as the signal strength of received data frames sent from the station STA1*a*. For example, the access point AP1 may transfer information on the receiving signal strength of received frames sent from the station STA1*a* when requesting a handover 44, so that the access point AP2 can compare the receiving signal strength with its own receiving signal strength to determine whether or not it is possible to accept the handover. The system may be adapted in such a manner that a handover request 44 is sent from the access point AP1 just when the signal strength of received data frames sent from the station STA1*a* deteriorates to its lowest tolerable limit to thereby allow the access point AP2 to accept the handover without comparing the receiving signal strengths.

When accepting the handover, the access point AP2 forwards to the access point AP1 a handover response 46 including handover acceptance information representing the acceptance of the handover and the receiving signal strength at the access point AP2, etc., step S18. At this time, the access point AP1 continues to receive the data frames 16 sent from the station STA1*a*. Specifically, during the handover processing, the access point AP1, having the mobile station in question STA1*a* registered in its identification code management table 11 at that time, should continue to transmit and receive the data frames 16 to and from the mobile station STA1*a*.

The access point AP1, when receiving the handover response 46, informs the access point AP2 of the handover commission 48 containing the address of the station STA1*a*, the identification code BSSID assigned to the station and information about beacon transmission, etc., step S20. Then, the access point AP2 registers the informed address and identification code BSSID, i.e. "A", in its own identification code management table 11, step S22, and further informs the access point AP1 of the handover completion 50, step S24.

The access point AP1, after informed of the handover completion, cancels the information of the station STA1*a* from its own identification code management table 11, step S26. At this time, however, the access point AP1 should not change the assignment state corresponding to the identification code BSSID, "A", to "unassigned" in its identification code assignment table 12. Because the station STA1a only has been handed over to the other wireless network BSS2 and still remains associated with the extended wireless network ESS, the same identification code BSSID and access point address should not be assigned to another station.

The handover procedure is completed as described above. From the next data frame 16, the access point AP2 will transmit and receive the data frames 16 to and from the station STA1a. The access point AP1 ends the transmission of beacon frames 16 containing the identification code BSSID handed over to the access point AP2. Instead, the access point AP2 starts the transmission of beacon frames 16 containing the identification code BSSID taken over from the access point AP1.

Figure 9:
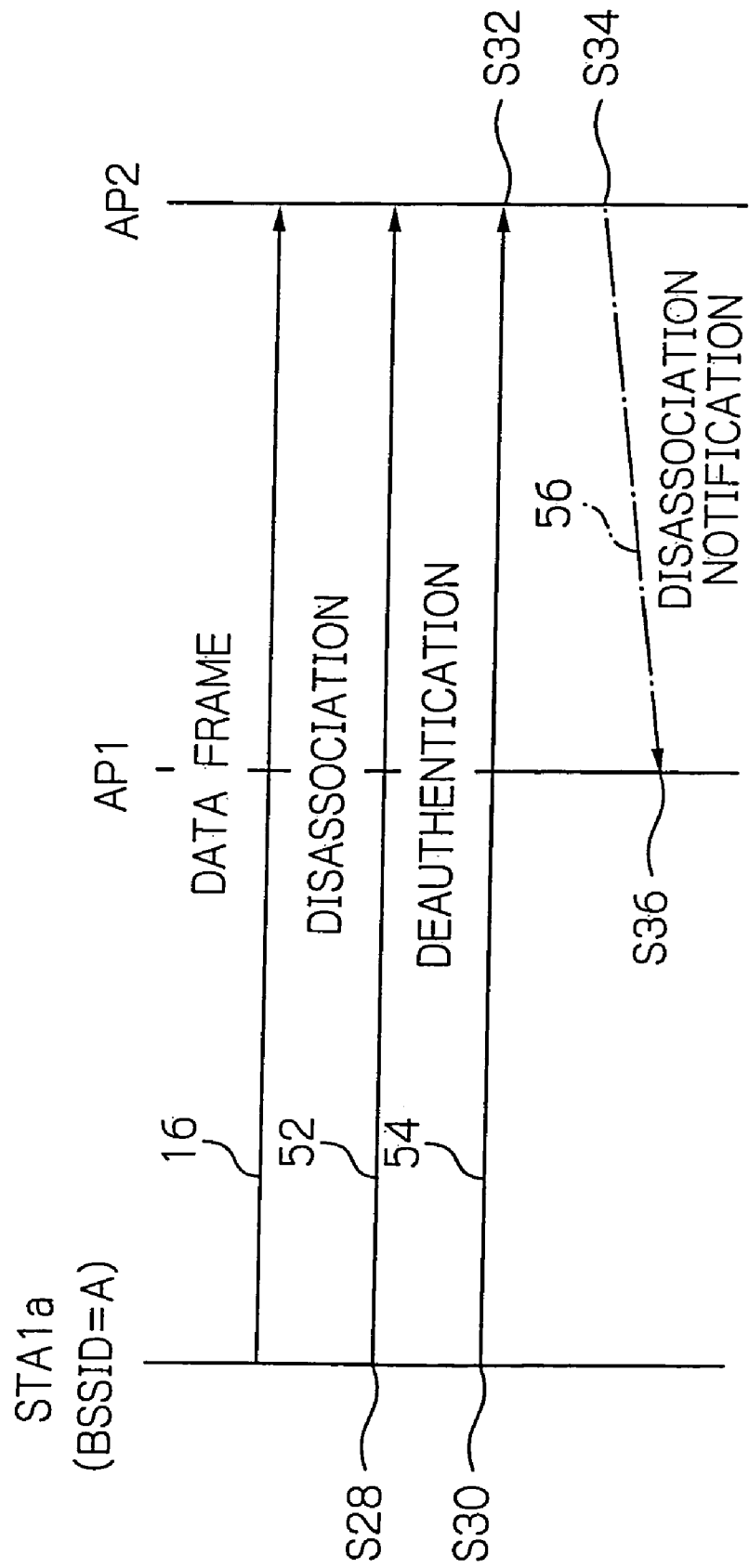
FIG. 9 schematically shows a disassociation procedure of the mobile station shown in FIG. 2.

FIG. 9 shows the disassociation procedure of the station STA1a shown in FIG. 2. When the station STA1a that presently belongs to the wireless network BSS2 served by the access point AP2 having accepted the handover intends to leave the extended wireless network ESS including the wireless network BSS2, it shall send a disassociation frame 52, step S28, and a deauthentication frame 54 to the access point AP2, step S30. The access point AP2 cancels the registration of the address and identification code BSSID (="A") corresponding to the station STA1a from its own identification code management table 11, step S32, and sends a disassociation notification 56 to the access point AP1 over the extended wireless network ESS, step S34. The disassociation notification contains information about the identification code BSSID assigned to the leaving station STA1a. The access point AP2 confirms the identification code BSSID contained in the disassociation frame 52 or the deauthentication frame 54 to thereby know the identification code BSSID assigned to the leaving station STA1a and the address of the access point, in this example, AP1, assigned thereto.

The access point AP1, receiving the disassociation notification 52, compares the identification code BSSID contained in the disassociation notification 52 with its own identification code assignment table 12 and changes the assignment state of the appropriate identification code BSSID to "unassigned", step S36. Then, it is possible to assign this identification code BSSID to another mobile station.

As described above, in the wireless LAN system 10 according to the illustrative embodiment, the access points AP1 and AP2 control a mobile station going to associate the wireless network BSS by assigning the station to an individual identification code BSSID, and, when handing over the station, deliver the identification code BSSID to an adjacent access point into which the station moves together with the beacon transmission information, etc. The handover is so carried out that the station does not need to invoke the disassociation service from the wireless network and the reassociation service with the adjacent wireless network. It is thus possible to implement an interruption-free handover function.

Some modifications may be made on the illustrative embodiment. With the illustrative embodiment, each of the access points AP1 and AP2 is provided with the own identification code assignment table 12 thereof, and manages the identification codes BSSIDs within a range allocated to it beforehand. Alternatively, a central control station may be arranged which is adapted to manage all of the usable identification codes BSSIDs throughout the wireless LAN system 10, and each access point may assign an identification code to a mobile station under the control of the central control station. Under the centralized control of the identification codes described above, disassociation notifications may be sent to the central control station, which is adapted for managing the assignment states, i.e. "unassigned" or "assigned".

The system described above is adapted to change its source address SA and its identification code BSSID when an association of a mobile station with a wireless network BSS is completed. Alternatively, the system may be adapted to make such changing at the time when the probe request is received from a new station, and then start transmitting a beacon frame and a probe response frame containing the changed address and identification code levels.

With the preferred embodiment described above, a handover request is sent from an access point invoking the request to an access point to be handed over. Alternatively, a handover request maybe invoked conversely, i.e. from an access point willing to accept a handover request.

Further with the preferred embodiment, an access point AP2 to be handed over is informed of the network information of a beacon frame an access point AP1 invoking a handover request to, and then the access point AP2 transmits the beacon frame containing the network information of the access point AP1. If the network information is centralized in the wireless LAN system 10, then the delivery of the network information is unnecessary.

Figure 10:
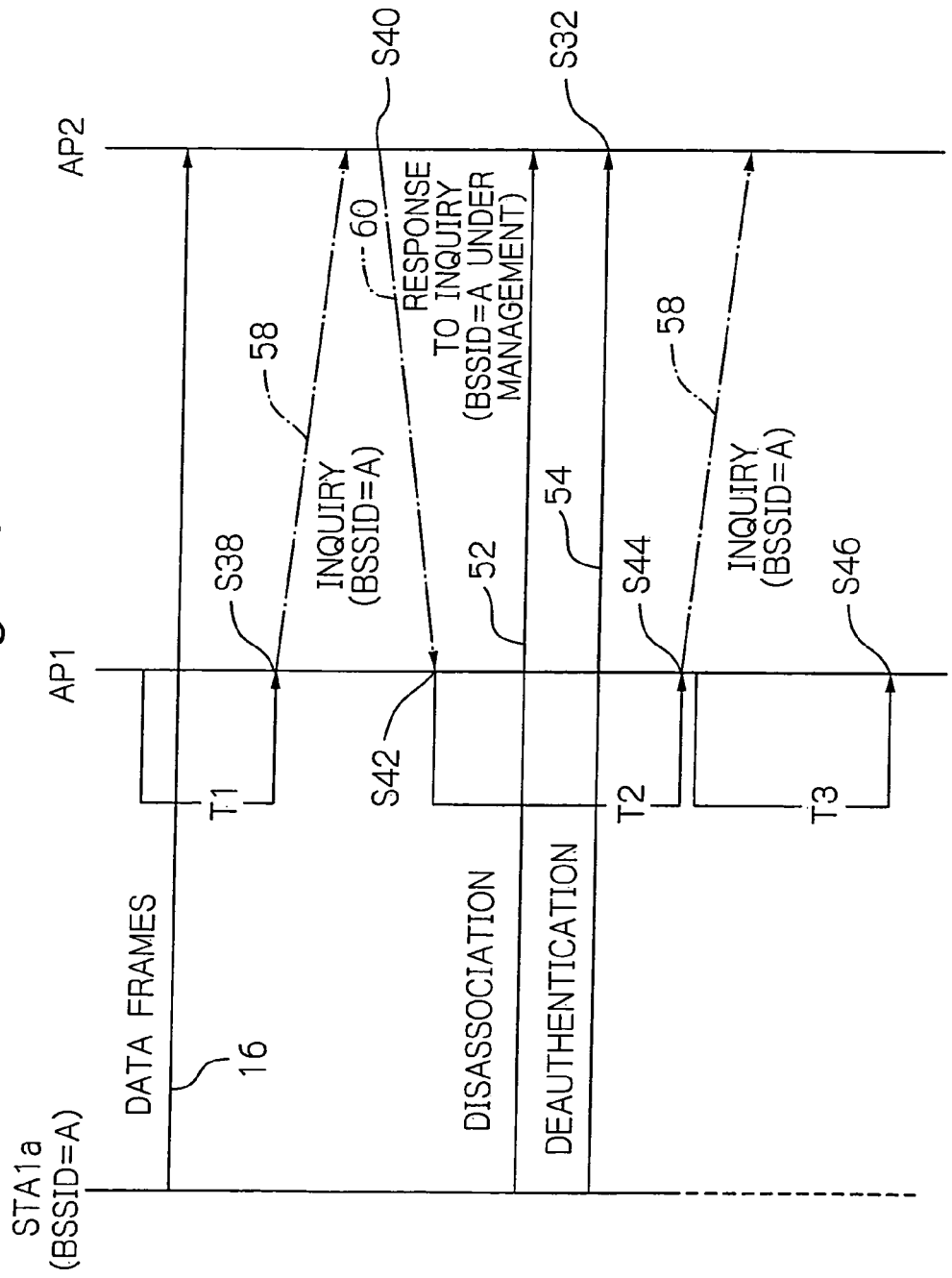
FIG. 10 schematically shows a disassociation procedure according to an alternative embodiment of the invention.

FIG. 10 shows the disassociation procedure according to an alternative embodiment of the invention. This procedural sequence is for renewal of the identification code assignment table 12 and used instead of the procedural sequence shown in FIG. 9 of the illustrative embodiment described with reference to FIG. 2.

In FIG. 10, it is assumed that the station STA1a, which was initially associated with the wireless network BSS1 served by the access point AP1 and was allotted to an individual identification code BSSID, has moved into, and been handed over to, the wireless network BSS2 covered by the access point AP2. The access point AP1 having assigned the identification code BSSID to the Station STA1a hands, after a predetermined period of time Ti has passed, the station STA1a over to another access point AP2. At that time, if the identification code BSSID remains "assigned" in its own identification code assignment table 12, the access point AP1 then broadcasts an inquiry frame 58 of the identification code management state about this identification code BSSID, set to "A", within the extended wireless network ESS, step S38.

When any one, e.g. AP2, of the access points included in the extended wireless network ESS has the appropriate identification code BSSID registered, the access point AP2 having that identification code registered will send a response frame 60 of the identification code management state representative of this identification code BSSID under management, step S40. However, if there is no access point having the identification code registered, no response will be transmitted.

The access point AP1, when receiving the response frame 60 of the identification code management state about the identification code BSSID inquired by itself from the access point AP2, is able to confirm that the station STA1a is in association with and under the control of the access point AP2. Therefore, while the access point AP1 keeps the state in its own identification code assignment table 12 "assigned", it starts operating its timer, not shown, for a predetermined period of time T2, step 842.

At the time the predetermined period of time T2 has passed without receiving anything, step S44, the access point AP1 broadcasts again an inquiry frame 58 of the identification code management state. During a predetermined period of time T3, if the station STA1a leaves the extended wireless network ESS, any access points, including the access point AP2, transmits no response frame 60 of the identification code management state. If the access point AP1 receives no response in the period of time T3, then it determines that the station corresponding to the identification code stays no longer in the extended wireless network ESS, and changes the assignment state of the corresponding identification code BSSID, "A", in its own identification code assignment table 12 to "unassigned", step S46.

Under the situation described above, the identification code BSSID assigned to the mobile station STA1a is kept "assigned" in the identification code assignment table 12 of the access point AP1 regardless of the disassociation of the station STA1a from the wireless network BSS2 including the access point AP2. That is, the identification code assignment table 12 does not reflect the actual state of the station STA1a within the extended wireless network ESS. This situation can occur, as described on the illustrative embodiment shown in FIG. 1, when the access point AP2 receives the disassociation frame 52 and deauthentication frame 54 sent from the station STA1a and then sends the disassociation notification 56 for the station STA1a to the extended wireless network ESS, the access point AP1 having not received the disassociation notification 54 due to noise or the like.

In the disassociation procedure of the alternative embodiment described above, the system is adapted to assign an identification code BSSID and thereafter inquire, each time a predetermined period of time has passed, how the identification code is managed in respect of the identification code BSSID of the extended wireless network ESS. This allows the state to be corrected after a predetermined period of time even when the identification code assignment table 12 does not reflect the actual state but the identification code BSSID assigned to the disassociated station STA1a still remains "assigned", so as to prevent the incorrect state of the identification code assignment table 12 from lasting very long time, thus effectively utilizing the finite resources of the assignable identification codes BSSIDs.

Some modifications may be made on the alternative embodiment. With the alternative embodiment described above, the access point AP1 broadcasts an inquiry frame 58 of the identification code management state about the identification code BSSID periodically at the intervals corresponding to the predetermined period of time T1 and no response received changes the assignment state of the identification code assignment table 12 to "unassigned". Alternatively, the system may be configured to change, after a specified time period has passed from setting the assignment, the assignment state to "unassigned" without inquiring.

Figure 11:
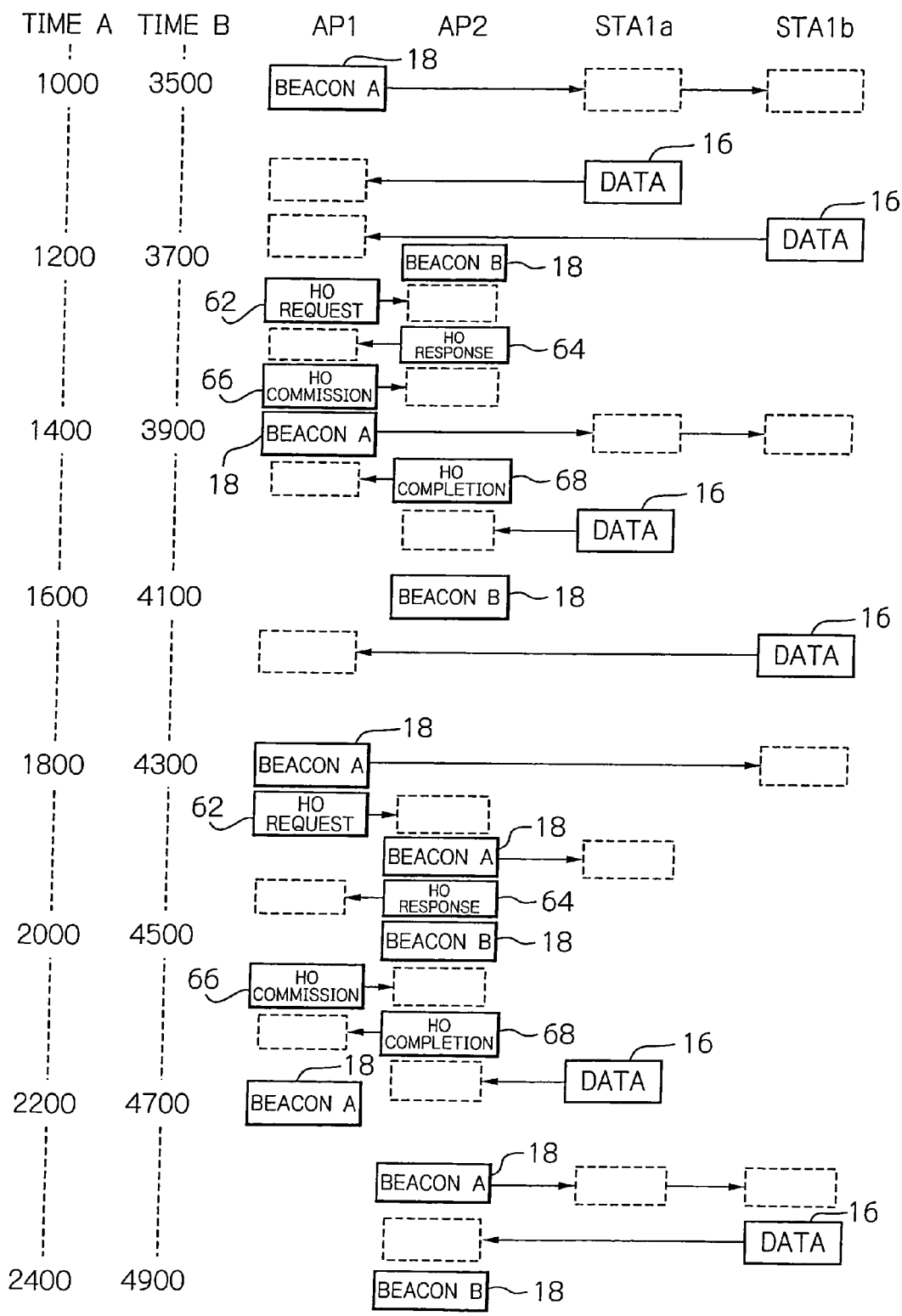
FIG. 11 schematically shows a handover procedure and a transmission of beacon frames according to another alternative embodiment of the invention.

FIG. 11 depicts the handover procedure and transmission of beacon frames 16 according to another alternative embodiment of the invention. The functional procedure of the instant alternative embodiment is a combination of the procedure for joining and associating a wireless network shown in FIG. 4 with the handover procedure shown in FIG. 11. More specifically, each of the wireless networks BSS1 and BSS2 has one individual identification code BSSID and one source address SA, i.e. the address of the access point AP. When a mobile station, e.g. STA1a associates the wireless network BSS1, for example, it is allotted to the identification code BSSID. When the station is handed over to another wireless network, e.g. BSS2, from the wireless network BSS1 within the extended wireless network ESS, the other wireless network BSS2 to be handed over takes over the identification code BSSID, etc., assigned to that mobile station STA1a.

The association of the station with the wireless network BSS1 and the handover procedure to the wireless network BSS2 following thereto will be described below. As shown in FIG. 4, the access point AP1 in this example periodically transmits a beacon frame 18 having its source address SA and identification code BSSID both set to the address assigned thereto in the extended wireless network ESS. The access point AP1, when received a probe request frame 20 sent from the station STA1a which intends to be associated with the wireless network BSS1, sets the source address SA and identification code BSSID in a probe response frame 22 to the individual address assigned thereto as with the beacon frame 18, and transmits the frame 22. The station STA1a receives the beacon frame 18 and/or the probe response frame 22 to thereby recognize the address and the identification code BSSID of the access point AP1, and thus will be a member of the wireless network BSS1.

As shown in FIG. 11, the access point AP1 transmits the beacon frame A having its source, address SA and identification code BSSID set to "A", periodically at an interval of 400 millisecond, in the instant embodiment. The other access point AP2 also transmits the beacon frame B having its source address SA and identification code BSSID set to "B", periodically at an interval of 400 millisecond. Both of the stations STA1a and STA1b join the wireless network BSS1 served by the access point AP1, and recognize that the source address SA and the identification code BSSID of the wireless network BSS1 which they are joining are set to "A".

The station STA1a is going to approach the wireless network BSS2 while moving within the wireless network BSS1. When the access point AP1 detects the deterioration in the receiving signal strength of the data frame 16 sent from the station STA1a. If the receiving signal strength has become lower than a preset threshold level, for example, the access point AP1 then begins to search for an access point to be handed over the station STA1a. The handover function is the same as shown in FIG. 8, and implemented by sequential frame transfer in the form of handover (HO) request 62, handover response 64, handover commission 66 and handover completion 68. The access point AP2 which accepted the handover of the station STA1a registers the existence of the station STA1a notified from the access point AP1 in its management table 12.

The access point AP2 which has accepted the handover of the station STA1a transmits, after the time 4400, the current beacon frame B having its source address SA and identification code BSSID both set to "B" as well as the beacon frame A having its source address SA and identification code BSSID both set to "A" periodically at an interval of 400 millisecond. The station STA1a receives the beacon frame A from the access point AP2, and is thereby able to continue its communication without recognition of the handover.

Following the station STA1a, when the other station STA1b is handed over to the wireless network BSS2, the station STA1b is registered in the management table 11 of the access point AP2 by the same handover function. Since the access point AP2 has already transmitted the beacon frame A to the station STA1a, the other station STA1b may receive this beacon frame A. Therefore, the access point AP2 does not need to transmit a new beacon frame to the station STA1b.

When the station STA1a which moved to the wireless network BSS2 intends to withdraw from the extended wireless network ESS including the wireless network BSS2, it will send a disassociation frame 34 and an deauthentication frame 36 to the access point AP2. After receiving them, the access point AP2 cancels the registration associated with the station STA1a from its management table 11. In this case, however, the disassociation notification 56, FIG. 9, is not sent to the access point AP1. The access point AP1 maybe structured without having a table corresponding to the identification code assignment table 12 in the illustrative embodiment shown in FIG. 2. Therefore, the reception of a disassociation notification by the access point AP1 is meaningless.

The access point AP2 ends the periodic transmission of the beacon frame A at the time when the station STA1*a* has withdrawn or has further moved to another wireless network BSS so that the transmission of the beacon frame A has become unnecessary.

As described above, according to the handover function of the instant alternative embodiment, when the mobile station associated with the access point AP1 is handed over to the other access point AP2, the access point AP2 which accepted the handover of the station transmits the beacon frame 18 containing the same source address SA and identification code BSSID as the access station AP1 had before the handover. Therefore, for implementing the handover, the mobile station does not need to invoke both the disassociation procedure from the wireless network BSS and the reassociation procedure with the adjacent wireless network, thus accomplishing the interruption-free handover.

In the illustrative embodiments described earlier, it is necessary to provide the different identification codes BSSIDs as many as the stations associated with the extended wireless network ESS and manage the correspondence between the identification codes BSSIDs and the stations. In the instant alternative embodiment, however, the number of required identification codes BSSIDs is reduced to the number of the access points APs, thus the management of the identification codes being much easier.

Some modifications may be made on the instant alternative embodiment. With the alternative embodiment described above, the access point AP1 which invokes the handover notifies the access point AP2 to be handed over of the network information of the beacon frame 18, and then the access point AP2 transmits the beacon frame containing the network information of the access point AP1. Alternatively, in an application in which the network information is unified throughout the wireless LAN system 10, the delivery of network information is unnecessary.

In the instant alternative embodiment, when each access point AP detects the deterioration in the receiving signal strength of a mobile station associated with its own wireless network BSS, it sends a handover request 62. The system may be configured to send, when the access point AP1 receives again the data frame 16 sent from the station STA1 handed over and moved to the other wireless network BSS2, a handover request 62 to the access point AP2 to return the station STA1 thereto. That will reduce the number of the stations that are handed over within the wireless LAN 10, and therefore unnecessary beacon transmission is prevented and more stable communication can be established.

With the instant alternative embodiment, when the receiving signal strength from a mobile station has become lower than a preset threshold level, the access point AP1 initiates the handover procedure. Alternatively, the system may be structured in such a fashion that a first threshold level corresponding to the lowest limit for allowing the normal reception of a signal and a second threshold level higher than the first threshold level are provided, and the access point AP1 initiates the handover procedure whenever the receiving signal strength from a mobile station having its own identification code BSSID has become lower than the first threshold level or whenever the receiving signal strength from a mobile station having the identification code BSSID of another access point has become lower than the second threshold level.

As described above, the handover is carried out in such a manner that an access point hands over a mobile station having its own identification code BSSID as late as possible and a mobile station having the identification code BSSID of another access point as early as possible. That permits the number of the stations that are handed over to be reduced, and therefore unnecessary beacon transmission is prevented and more stable communication can be accomplished.

Figure 12:
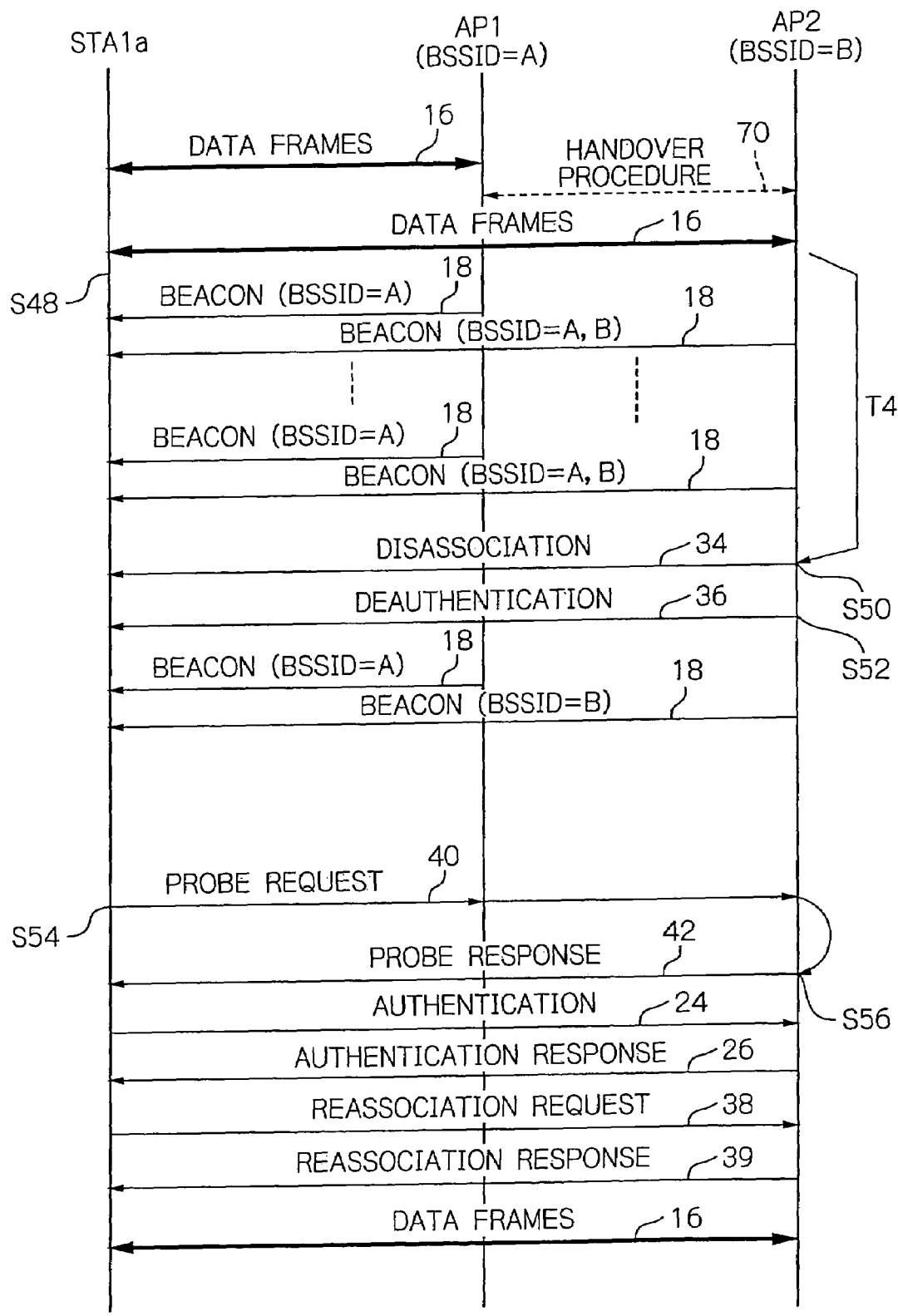
FIG. 12 schematically shows disassociation and reassociation procedures according to a further alternative embodiment of the invention.

Now, reference will be made to FIG. 12 which shows the disassociation and reassociation procedures according to the further alternative embodiment of the invention. The operational procedure of the instant embodiment follows a handover 70 and a transmission of beacon frames 18 as carried out with the previously described alternative embodiment and a cease of the transmission of the data frame continuing for a predetermined period of time T4.

Supposing that the mobile station STA1*a*, which has been associated with the access point AP1 having its identification code BSSID set to "A", moves, during VoIP communication, into the other wireless network BSS2 covered by the other access point AP2 having its identification code BSSID set to "B", and is then handed over to the access point AP2.

The access point AP2 has accepted the station STA1*a* recognizing as "A" the identification code BSSID of the wireless network BSS with which the station is associated. The access point AP2 therefore starts transmitting a beacon frame 18 having its identification code BSSID set to "B" as well as a beacon frame 18 having its identification code BSSID set to "A". VoIP communication continues. Thereafter, the station STA1*a* finishes the voice communication, and therefore no data frames 16 continue to be transmitted any more, step S48. The access point AP2 still continues the transmission of beacon frames 18 having its identification code BSSID set to "A" for a while following the communication finished.

When the period of non-communication reaches a predetermined period of time T4 after the transmission of data frames 18 to and from the station STA1*a* has ceased, the access point AP2 sends a disassociation frame 34, step S50, and a deauthentication frame 36, S52, to force the station STA1*a* to withdraw from the wireless network BSS2. The disassociation and deauthentication frames 34 and 36 which have the source address SA and the identification code BSSID thereof both set to "A" are sent to the station STA1*a* from the access point AP2, in place of the access point AP1. If there is no other station handed over from the access point AP1, the withdrawal of the station STA1*a* now allows the access point AP2 to stop the transmission of a beacon frame 18 having its identification code BSSID set to "A".

If the station STA1*a* intends to communicate again, it will send a probe request 40 again, step S54. At this instant, if the station STA1*a* exists within the area covered by the wireless network BSS2, then the access point AP2 sends back a probe response 42 having its identification code BSSID set to "B", so that the station STA1*a* is reassociated with the wireless network BSS2 serviced by the access point AP2, step S56.

As described above, in the instant alternative embodiment, while monitoring the transmission and reception of data frames 16 to and from the station STA1*a* which has a different identification code BSSID from its own code, and when the communication has ceased and the non-communication state lasts for the predetermined period of time T4, the access point AP2 forces that station to withdraw from the wireless network BSS2. Further, when the station STA1*a* that withdrew once intends join again, it will be associated with the wireless network BSS2 where it presently stays. Therefore, unnecessary beacon transmission is prevented and more stable communication can be established.

The present alternative embodiment is directed to an application to VoIP. The invention is, however, not restricted to VoIP. It is possible to apply the present invention to all kinds of telecommunications, such as streaming, in which no interruption is desirable during the handover processing of a mobile station or terminal device carried out between at least two access points or base stations.

The entire disclosure of Japanese patent application No. 2005-087498 filed on Mar. 25, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What we claim is:

1. A handover method in a wireless local area network (LAN) including a first access point that controls wireless communications with mobile stations existing in a first wireless area and a second access point that controls wireless communications with mobile stations existing in a second wireless area, the first and second wireless area partially overlapping each other, comprising the steps of:

assigning, when the first access point is requested by first one of the stations existing in the first wireless area for an association with the wireless LAN, a first identification code different from an identification code assigned to another of the stations which is already associated with the wireless LAN to approve the association;

assigning, when the second access point is requested by second one of the stations existing in the second wireless area for an association with the wireless LAN, a second identification code different from an identification code assigned to another of the stations which is already associated with the wireless LAN to approve the association;

periodically transmitting from the first or second access point a beacon frame to the first or second station existing and associated in the first or second wireless areas, respectively, the beacon frame containing an identification code corresponding to the first or second station;

monitoring by the first access point a signal received from the first station existing in the first wireless area;

requesting, when the first access point detects the received signal being lower than a predetermined level, the second access point for a handover of the first station;

determining, when the second access point is requested for the handover from the first access point, whether to accept the handover based on a signal received from the first station;

accepting the handover of the first station by the second access point; and periodically transmitting from the second access point, in place of the first access point, a beacon frame containing the first identification code assigned to the first station;

wherein the first or second access point assigns, when approving the association of the first or second station, the first or second station to an identification code provided to the first or second access point, respectively;

each of the first and second access points comprising: an identification code manager for managing whether the identification code is unassigned or assigned; and a station manager for managing correspondence of the first or second station of which the association is approved with the identification code assigned to the first or second station, respectively.

2. The method in accordance with claim 1, further comprising the step of inquiring, when the first or second access point is requested for the association with the wireless LAN from the first or second station existing in the first or second wireless areas, respectively, a manager provided in the wireless LAN for managing identification codes in the wireless LAN to obtain an unassigned identification code to assign the identification code to the first or second station, respectively.

3. The method in accordance with claim 1, wherein, when the first access point hands over the first station to the second access point and is thereafter notified of a disassociation of the first station from the wireless LAN by the second access point, the identification code manager of the first access point changes a corresponding identification code to an unassigned state.

4. The method in accordance with claim 1, wherein the first access point hands over the first station to the second access point and thereafter periodically inquires the second access point of a state of the first station, the first access point changing, when not notified by the second access point of the first station being associated with the wireless LAN, a corresponding identification code to an unassigned state by the identification code manager.

5. A handover method in a wireless local area network (LAN) including a first access point that controls wireless communications with mobile stations existing in a first wireless area and a second access point that controls wireless communications with mobile stations existing in a second wireless area, the first and second wireless area partially overlapping each other, comprising the steps of:

assigning, when the first access point is requested by first one of the stations existing in the first wireless area for an association with the wireless LAN, a first identification code different from an identification code assigned to another of the stations which is already associated with the wireless LAN to approve the association;

assigning, when the second access point is requested by second one of the stations existing in the second wireless area for an association with the wireless LAN, a second identification code different from an identification code assigned to another of the stations which is already associated with the wireless LAN to approve the association;

periodically transmitting from the first or second access point a beacon frame to the first or second station existing and associated in the first or second wireless areas, respectively, the beacon frame containing an identification code corresponding to the first or second station;

monitoring by the second access point a signal received from the first station which exists in the second wireless area and of which the association is approved by the first access point;

requesting, when the second access point detects the received signal being higher than a predetermined level, the first access point for a handover of the first station;

accepting the handover of the first station by the second access point; and periodically transmitting from the second access point, in place of the first access point, a beacon frame containing the first identification code assigned to the first station;

wherein the first or second access point assigns, when approving the association of the first or second station, the first or second station to an identification code provided to the first or second access point, respectively, each of the first and second access points comprising: an identification code manager for managing whether the identification code is unassigned or assigned; and a station manager for managing correspondence of the first or second station of which the association is approved with the identification code assigned to the first or second station, respectively.

6. The method in accordance with claim 5, further comprising the step of inquiring, when the first or second access point is requested for the association with the wireless LAN from the first or second station existing in the first or second wireless areas, respectively, a manager provided in the wireless LAN for managing identification codes in the wireless LAN to obtain an unassigned identification code to assign the identification code to the first or second station, respectively.

7. The method in accordance with claim 5, wherein, when the first access point hands over the first station to the second access point and is thereafter notified of a disassociation of the first station from the wireless LAN by the second access point, the identification code manager of the first access point changes a corresponding identification code to an unassigned state.

8. The method in accordance with claim 5, wherein the first access point hands over the first station to the second access point and thereafter periodically inquires the second access point of a state of the first station, the first access point changing, when not notified by the second access point of the first station being associated with the wireless LAN, a corresponding identification code to an unassigned state by the identification code manager.

* * * * *